US009944847B2

(12) United States Patent
Baldo et al.

(10) Patent No.: US 9,944,847 B2
(45) Date of Patent: Apr. 17, 2018

(54) METHODS AND COMPOSITIONS FOR THE UPCONVERSION OF LIGHT

(71) Applicant: Massachusetts Institute of Technology, Cambridge, MA (US)

(72) Inventors: Marc A. Baldo, Lexington, MA (US); Daniel N. Congreve, Cambridge, MA (US); Nicholas John Thompson, Hamilton, NJ (US); Mark W. B. Wilson, Somerville, MA (US); Mengfei Wu, Cambridge, MA (US); Moungi G. Bawendi, Cambridge, MA (US); Vladimir Bulovic, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 235 days.

(21) Appl. No.: 15/045,028

(22) Filed: Feb. 16, 2016

(65) Prior Publication Data
US 2016/0237343 A1   Aug. 18, 2016

Related U.S. Application Data

(60) Provisional application No. 62/117,000, filed on Feb. 17, 2015.

(51) Int. Cl.
    *G02F 1/35*   (2006.01)
    *C09K 11/56*  (2006.01)
    (Continued)

(52) U.S. Cl.
    CPC ............... *C09K 11/562* (2013.01); *G01J 1/58* (2013.01)

(58) Field of Classification Search
    CPC .................................................... C09K 11/562
    See application file for complete search history.

(56) References Cited

U.S. PATENT DOCUMENTS 8,724,214 B2 *  5/2014  Schut ................... G02F 1/3526
                                              252/301.16
2006/0249202 A1  11/2006  Yoo et al.
(Continued)

FOREIGN PATENT DOCUMENTS

WO   WO 2006/034268 A2   3/2006
WO   WO 2009/023667 A1   2/2009
WO   WO 2014/089179 A2   6/2014

OTHER PUBLICATIONS

Chongke Bi, Ye Yuan, Ronghui Zhang, Yiqing Xiang, Yuehuan Wang, Jiawan Zhang, "A Dynamic Mode Decomposition Based Edge Detection Method for Art Images", Photonics Journal IEEE, vol. 9, pp. 1-13, 2017, ISSN 1943-0655.*

(Continued)

*Primary Examiner* — Rhonda Peace
(74) *Attorney, Agent, or Firm* — Wolf, Greenfield & Sacks, P.C.

(57) ABSTRACT

The present invention generally relates to composition and methods for upconverting light. In some embodiments, the composition and methods comprise an organic material, a nanocrystal, and a ligand capable of facilitating energy transfer between the nanocrystal and the organic material. In certain embodiments, the nanocrystal has a first excited energy state with an energy greater than a triplet state of the organic material. The organic material, in some embodiments, may be aromatic and/or include one or more pi-conjugated carbon-carbon double bonds. In some cases, incident light may be absorbed by the nanocrystal to produce triplet excitons. The triplet excitons may then transfer from the nanocrystal to the organic material and undergo triplet-triplet annihilation, creating a singlet state of approximately (Continued)

twice the energy of the triplet exciton. In certain embodiments, the singlet state fluoresces, resulting in the formation of a high energy photon.

25 Claims, 12 Drawing Sheets

(51) Int. Cl.
  *G01J 1/58* (2006.01)
  *G02F 2/02* (2006.01)

(56) References Cited

U.S. PATENT DOCUMENTS

| | | | |
|---|---|---|---|
| 2007/0132052 | A1 | 6/2007 | Sargent et al. |
| 2008/0066802 | A1 | 3/2008 | Reddy |
| 2009/0044864 | A1 | 2/2009 | Thompson et al. |
| 2009/0290211 | A1 | 11/2009 | Miteva et al. |
| 2010/0014799 | A1 | 1/2010 | Bulovic et al. |
| 2011/0127445 | A1* | 6/2011 | Zhang ............... A61K 41/0071 250/459.1 |
| 2011/0180127 | A1 | 7/2011 | Wan et al. |
| 2011/0253197 | A1 | 10/2011 | Mapel et al. |
| 2013/0324909 | A1 | 12/2013 | Aydt et al. |
| 2014/0046083 | A1 | 2/2014 | Tilyou et al. |
| 2014/0049155 | A1 | 2/2014 | Kurtin |
| 2014/0061486 | A1 | 3/2014 | Bao et al. |
| 2014/0091278 | A1 | 4/2014 | Sykora et al. |
| 2014/0224329 | A1* | 8/2014 | Congreve ............ H01L 51/0055 136/263 |
| 2016/0237343 | A1* | 8/2016 | Baldo ................. C09K 11/562 |
| 2016/0238455 | A1* | 8/2016 | Congreve ................. G01J 9/00 |

OTHER PUBLICATIONS

International Preliminary Report on Patentability dated Aug. 31, 2017 for Application No. PCT/US2016/018017.
Invitation to Pay Additional Fees dated Feb. 18, 2014 for Application No. PCT/US2013/073068.
International Search Report and Written Opinion dated Aug. 25, 2014 for Application No. PCT/US2013/073068.
International Preliminary Report on Patentability dated Jun. 18, 2015 for Application No. PCT/US2013/073068.
International Search Report and Written Opinion for Application No. PCT/US2016/018004 dated Apr. 22, 2016.
Brown et al., Energy level modification in lead sulfide quantum dot thin films through ligand exchange. ACS Nano. Jun. 24, 2014;8(6):5863-72. doi: 10.1021/nn500897c. Epub Jun. 3, 2014.
Chu et al., Efficient photovoltaic energy conversion in tetracene-C60 based heterojunctions. Applied Physics Letters. Jun. 2005;86(24):243506-1-243506-3.
Congreve et al., External quantum efficiency above 100% in a singlet-exciton-fission-based organic photovoltaic cell. Science. Apr. 19, 2013;340(6130):334-7. doi: 10.1123/science.1232994.
Johnson, Hybrid Solar Cells Promise More Than 95% Efficiency. EE Times. Oct. 13, 2014; 5 pages, Retrieved from http://www.eetimes.com/document.asp?doc_id=1324264& on Jun. 2, 2016.
Lee et al., Public Oral Disclosure at Peaceful Valley Ranch and Conference Center, Lyons, CO; Jun. 17, 2012, 40 pages.
Paci et al., Singlet fission for dye-sensitized solar cells: can a suitable sensitizer be found? J Am Chem Soc. Dec. 27, 2006;128(51):16546-53.
Peng et al., Formation of high-quality CdTe, CdSe, and CdS nanocrystals using CdO as precursor. J Am Chem Soc. Jan. 10, 2001; 123(1):183-4.
Smith et al., Recent advances in singlet fission. Annu Rev Phys Chem. 2013;64:361-86. doi: 10.1146/annurev-physchem-040412-110130. Epub Jan. 7, 2013.
Smith et al., Singlet fission. Chem Rev. Nov. 10, 2010;110(11):6891-936. doi: 10.1021/cr1002613. Epub Nov. 1, 2010.
Thompson et al., Energy harvesting of non-emissive triplet excitons in tetracene by emissive PbS nanocrystals. Nat Mater. Nov. 2014;13(11):1039-43. doi: 10.1038/nmat4097. Epub Oct. 5, 2014.
Wu et al., Solid-state infrared-to-visible upconversion sensitized by colloidal nanocrystals. Nature Photonics. 2015;10:31-4. doi: 10/1038/NPHOTON.2015.2.26. Epub Nov. 23, 2015.
Office Action in U.S. Appl. No. 14/096,657, dated Feb. 3, 2016.
Office Action in U.S. Appl. No. 14/096,657, dated Jul. 12, 2016.
Invitation to Pay Additional Fees for Application No. PCT/US2016/018017 dated Mar. 25, 2016.
International Search Report and Written Opinion for Application No. PCT/US2016/018017 dated Jun. 10, 2016.

\* cited by examiner

METHODS AND COMPOSITIONS FOR THE UPCONVERSION OF LIGHT

RELATED APPLICATIONS

This application claims priority under 35 U.S.C. § 119(e) to U.S. Provisional Application Ser. No. 62/117,000, filed Feb. 17, 2015, which is incorporated herein by reference in its entirety for all purposes.

GOVERNMENT FUNDING

This invention was made with Government support under Grant No. DE-SC0001088 awarded by the Department of Energy. The Government has certain rights in the invention.

FIELD OF THE INVENTION

The present invention generally relates to composition and methods for upconverting light.

BACKGROUND

Upconversion is generally the process of converting two or more low energy photons into one higher energy photon. Modern upconversion devices are broadly split into three classes. Traditionally, the lanthanides, also known as the rare earth elements, have been used in photon upconversion due to their unusual electronic states. However, the weak absorption of the low energy state requires high intensity excitation. This, in addition to the narrow line width of the absorption of the lanthanides along with the inability to tune the absorption or emission position (fixed by the material), makes this class of devices unfeasible for incoherent, low-intensity and broad-spectrum excitation such as sunlight.

The second method of upconversion is triplet-triplet annihilation which achieves upconversion for weak incoherent light. The state-of-the-art devices typically use heavy-metal complexes as the low energy photon absorbing material. It is, however, difficult to find stable sensitizers among this class of materials with strong absorption in the near infrared spectrum. The low energy state lifetime is reduced as the energy decreases, making these material a poor choice for upconversion of NIR photons. These materials also suffer from reduced energetic distance between absorption and emission due to the energy gap between triplet and singlet states in the sensitizer. The most efficient demonstrations have been in the solution form, which limits applications.

The third class of upconversion uses non-linear crystals to achieve upconversion. These systems are only efficient when exposed to very high-intensity, coherent light. In addition, there are considerable requirements on the optical geometry and form factor of the device.

SUMMARY OF THE INVENTION

The present invention provides compositions and methods for upconverting light.

In one aspect, methods of upconverting light are provided. In some embodiments, the method comprises applying light having a first average wavelength to a nanocrystal associated with an organic material and a ligand, the organic material comprising an optionally substituted polyacene species or an optionally substituted polyene species, the nanocrystal comprising a group III-V compound, a group II-VI compound, or a group IV element, and determining light emitted from the organic material at a second average wavelength, wherein the second average wavelength is less than the first average wavelength.

In some embodiments, the method comprises applying light having a first average wavelength to a nanocrystal associated with an organic material and a ligand, the organic material comprising an oligoacene, a heteroacene, a perylene, a phthalocyanine, an oligothiophene, a furane, an anthracene, a rubrene, or a pentacene, the nanocrystal comprising a group III-V compound, a group II-VI compound, or a group IV element, and determining light emitted from the organic material at a second average wavelength, wherein the second average wavelength is less than the first average wavelength.

In another aspect, articles are provided. In some embodiments, the article comprises an organic material and a nanocrystal bound to a ligand, the organic material comprising a heteroacene, a perylene, a phthalocyanine, an oligothiophene, a furane, an anthracene, a rubrene, or a pentacene, the nanocrystal comprising a group III-V compound, a group II-VI compound, or a group IV element, the ligand being an organic compound having a linear carbon chain length of greater than or equal to 8 carbon atoms.

In some embodiments, the article comprises an organic material and a nanocrystal bound to a ligand, the organic material comprising a heteroacene, a perylene, a phthalocyanine, an oligothiophene, a furane, an anthracene, a rubrene, or a pentacene, the nanocrystal having a first excited energy state with an energy greater than a triplet energy state of the organic material, the ligand having a length of no more than 3 nm.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

Other aspects, embodiments and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

DETAILED DESCRIPTION

The present invention generally relates to composition and methods for upconverting light. In some embodiments, the composition and methods comprise an organic material, a nanocrystal, and a ligand capable of facilitating energy transfer between the nanocrystal and the organic material. In certain embodiments, the nanocrystal has a first excited energy state with an energy greater than a triplet state of the organic material. The organic material, in some embodiments, may be aromatic and/or include one or more pi-conjugated carbon-carbon double bonds. In some cases, incident light may be absorbed by the nanocrystal to produce triplet excitons. The triplet excitons may then transfer from the nanocrystal to the organic material and undergo triplet-triplet annihiliation, creating a singlet state of approximately twice the energy of the triplet exciton. In certain embodiments, the singlet state fluoresces, resulting in the formation of a high energy photon.

Embodiments herein relate to articles and methods containing materials for upconverting electromagnetic radiation (e.g., light). Upconverting generally refers to the process of converting two or more low energy photons to one higher energy photon (e.g., in contrast to downconversion, which generally refers to the process of converting one high energy photon into two or more low energy photons).

Figure 1A:
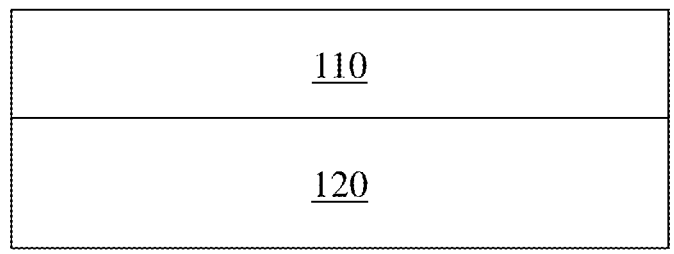
FIG. 1A is a schematic of an article comprising an organic material and a plurality of nanocrystals, according to one set of embodiments.
Figure 1B:
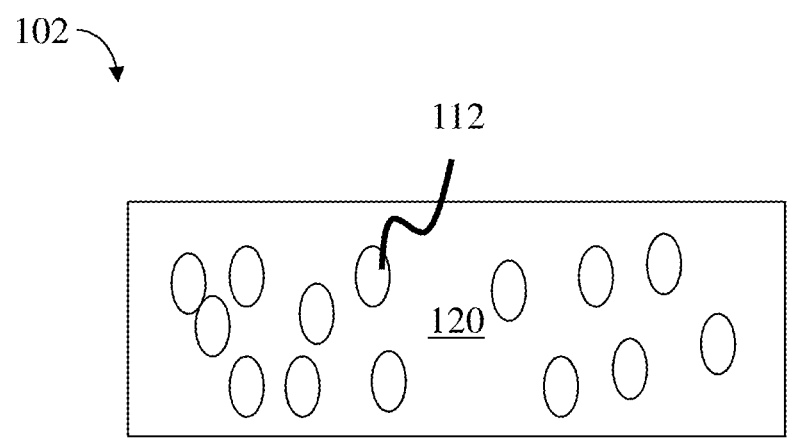
FIG. 1B is a schematic of an article comprising an organic material and a plurality of nanocrystals, according to one set of embodiments.

A non-limiting example of one embodiment of the invention is illustrated in FIG. 1A. In this figure, article 100 comprises nanocrystal layer 110 comprising the nanocrystal is deposited on at least a portion of a surface of organic material 120 (e.g., a layer of nanocrystals deposited on the organic material in the form of a thin film). In certain embodiments, as illustrated in FIG. 1B, article 102 comprises nanocrystals 112 embedded within organic material 120 (e.g., a plurality of nanocrystals embedded within a thin film of the organic material).

Thus, in some embodiments, the articles and methods described herein may absorb photonic energy (e.g., electromagnetic energy). In some embodiments, the articles and methods comprise an organic material, a nanocrystal, and a ligand. In certain embodiments, the organic material has a first excited energy state greater than the triplet energy of the nanocrystal (e.g., such that low energy light may be absorbed by the nanocrystal and transferred to the organic material). The organic material, in some embodiments, may be aromatic and/or include pi-conjugated carbon-carbon double bonds that can absorb incident photons. For example, the organic material may be a tetracene, or other organic materials such as those described herein.

In some such embodiments, the organic material may conduct triplet-triplet annihilation of triplet excitons such that a singlet state is generated, wherein the singlet state has an energy less than twice the triplet state of the organic material. In certain embodiments, the singlet state fluoresces, generating one high energy photon from the organic material for about every two low energy photons absorbed by the nanocrystal.

The term singlet is known in the art and generally refers to an energy state in which an electron is excited from the ground state (e.g., where electron spins are paired) to a first higher energy level (e.g., in the molecular electronic state) where the electron has the same spin orientation as it had in the ground state. The term triplet is also known in the art and generally refers to a refers to an energy state in which an electron is excited from the ground state to a higher energy state having the same spin orientation as the other unpaired electron.

The nanocrystal, in some embodiments, may be a nanocrystal having a band gap, which can absorb light and transfer triplet excitons to the organic material. One non-limiting example is PbS; other nanocrystals are discussed in more detail below. The photons may be transferred from the nanocrystal to the organic material via a ligand.

The ligand, when present, may be capable of facilitating energy transfer between the organic material and the nanocrystal. (e.g., the ligand adds solubility and/or passivates the nanocrystal). The ligand may comprise, for example, an alkyl chain (e.g., containing $(CH_2)_n$ or other moieties) through which the photons can be transmitted from the organic material to the nanocrystal. For example, the ligand may be positioned as a layer or a film between the nanocrystals and the organic material (e.g., the ligand bound to the nanocrystal). This and other arrangements are discussed in more detail below.

The articles and methods described herein, in one set of embodiments, offer several advantages as compared to traditional upconversion materials and methods including upconverting relatively low intensity, broadband, incoherent light. For example, upconversion devices comprising lanthanide materials typically have weak absorption of low energy states requiring high intensity excitation, and an inability to tune absorption or emission profiles. By contrast, certain articles described herein are capable of excitation of incoherent, low-intensity and broad-spectrum light (e.g., sunlight). In some embodiments, the articles and methods described herein also offer advantages over upconversion devices incorporating heavy-metal complexes as these material generally suffer from reduced energetic distances between absorption and emission due to the energy gap between triplet and singlet states in the sensitizer and thus have limited applications. Unlike traditional upconversion material, the articles and methods described herein do not necessarily require high-intensity and/or coherent light, at least in certain cases.

Some articles and methods as discussed herein may be useful in numerous applications including, but not limited to, solar cells. For example, certain articles as described herein may be incorporated into solar cells, allowing for absorption in the far infrared region of the solar spectrum unlike traditional and newly developed solar cell materials (e.g., crystalline silicon, Perovskites). Additionally, some of the articles and methods described herein may be useful in medical imaging and/or medical application (e.g., absorption of light may be tuned to the transparent window of the human body, higher energy emission may be used for imaging or activating a medical process (e.g., desorption of a drug from the surface of the nanocrystal)). In some cases, the articles and methods described herein may be useful in laboratory and/or military applications (e.g., sensitizing a visible light detector to infrared light).

As mentioned, in some embodiments, the article includes an organic material associated with a nanocrystal and, optionally, a ligand. In some cases, at least a portion of the organic material, such as substantially an entire surface of the organic material, may be associated with a nanocrystal and/or a ligand. In some embodiments, the organic material may associate with the nanocrystal and/or ligand by being arranged directly adjacent (e.g., in contact with) the nanocrystal and/or ligand. In certain embodiments, the organic material may associate with the nanocrystal and/or the optional ligand via formation of a bond, such as an ionic bond, a covalent bond, a hydrogen bond, a dative bond, Van der Waals interactions, and the like. The covalent bond may be, for example, carbon-carbon, carbon-oxygen, oxygen-silicon, sulfur-sulfur, phosphorus-nitrogen, carbon-nitrogen, metal-oxygen, or other covalent bonds. The hydrogen bond may be, for example, between hydroxyl, amine, carboxyl, thiol, and/or similar functional groups. The dative bond may be, for example, complexation or chelation between metal ions and monodentate or multidentate ligands.

The organic material generally comprises any material capable of having a first excited energy state less than or equal to twice a first excited triplet energy state. That is to say, the organic material, in some embodiments, may generate singlet excitons from triplet-triplet annihilation events. Without wishing to be bound by theory, triplet excitons transferred from the nanocrystal to the organic material undergo triplet-triplet annihilation, creating a singlet state of approximately twice the energy of the triplet exciton. In some embodiments, the singlet state is less than twice the energy of the photon. In certain embodiments, the singlet state fluoresces, creating one high energy photon (e.g., from the initial two low energy photons initially absorbed by the nanocrystal). The organic material and nanocystals may be selected and arranged such that, in operation, the nanocrystal absorbs energy (e.g., light) to produce a triplet exciton, which are then transferred to the organic material where they can undergo triplet-triplet annihilation.

The organic material may include any species capable of absorbing photonic energy and having a first excited singlet energy state less than twice the first excited triplet energy state. In some embodiments, the organic material is capable of generating singlet excitons from triplet-triplet annihilation events.

In some embodiments, the organic material is a solid singlet fission material. Some examples of singlet fission materials include heteroacenes, polyacenes (e.g., pentacene), oligophenyls, tetracyano-p-quinodimethane, 1,3-diphenylisobenzofuran, perylene, phthalocyanine, oligothiophene furane, anthracene, tris-(8-hydroxyquinoline) aluminum, benzophenone, rubrene, carotenoids, conjugated polymers (e.g., polydiacetylenes, poly(diethyl dipropargylmalonate), poly(p-phenylene)s, poly(p-phenylene vinylene)s, poly(arylene)s such as polythiophene, etc.), polyacenes, o-quinodimethanes, and the like.

In one set of embodiments, the organic material is an optionally substituted polyacene species or an optionally substituted polyene species. The optionally substituted polyacene species may be a polycyclic aromatic hydrocarbon that includes a network of fused benzene rings having the following formula,

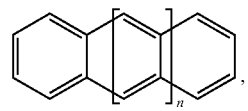

where n is 0, 1, 2, 3, 4, 5, 6, 7, 8, 9, 10, or greater than 10. In some cases, the polyacene species may be substituted with one or more additional functional groups. In some embodiments, the optionally substituted polyacene species may be an optionally substituted oligoacene species. In some embodiments, the optionally substituted polyacene species may be an optionally substituted naphthalene, an optionally substituted anthracene, an optionally substituted tetracene, an optionally substituted pentacene, or an optionally substituted hexacene. It should be understood that an optionally substituted polyacene containing any number of fused benzene rings may be suitable for use in embodiments described herein. Those of ordinary skill in the art would be able to select a polyacene species containing a desired number of fused benzene rings and/or the appropriate number and types of functional groups on the polyacene species in order to suit a particular application. In some cases, the optionally substituted polyacene species is an optionally substituted tetracene or an optionally substituted pentacene. Examples of such species include tetracene, rubrene, dithienyl tetracene, TIPS-tetracene, dibithienyl tetracene, diphenyl tetracene, terbutyl rubrene, pentacene, TIPS-pentacene, diphenyl pentacene, dibiphenyl pentacene, dithienyl pentacene, or dibithienyl pentacene.

The optionally substituted polyene species may be any species that contains at least two pi-conjugated carbon-carbon double bonds. For example, the optionally substituted polyene species may contain a series of alternating carbon-carbon double bonds and carbon-carbon single bonds. In some embodiments, the optionally substituted polyene species may be an optionally substituted oligoene species. In some cases, the optionally substituted polyene species may be a diene, triene, tetraene, or another species containing a greater number of pi-conjugated carbon-carbon double bonds. In some cases, the polyene species may be substituted with one or more additional functional groups. It should be understood that an optionally substituted polyene containing any number of pi-conjugated carbon-carbon double bonds may be suitable for use in embodiments described herein. Those of ordinary skill in the art would be able to select a polyene species containing a desired number of pi-conjugated carbon-carbon double bonds and/or the appropriate number and types of functional groups on the polyene species in order to suit a particular application. In some embodiments, the optionally substituted polyene species is diphenylbutadiene, diphenylhexatriene, or diphenyloctatetraene. In some cases, the optionally substituted polyacene may include a heteroatom (e.g., oxygen, nitrogen, sulfur, phosphorus, etc.) For example, the optionally substituted polyacene may be diphenyl isobenzofuran, or the like.

In some cases, the organic material may be doped with a dopant. For example, the dopant may comprise, in some cases, tetraphenyldibenzoperiflanthene.

As mentioned, the organic material may be associated with a nanocrystal, e.g., directly, or via a ligand. For instance, the organic material may be positioned next to the nanocrystals, and/or separated by a ligand. Generally, the nanocrystals associated with the organic material have a first excited energy state with an energy greater than or about equal to a triplet energy state of the organic material. In some embodiments, the first excited energy state is about twice that of the triplet energy state of the organic material.

In some embodiments, the nanocrystal may be a nanoparticle, such as a semiconductor nanoparticle or quantum dot. However, it should be understood that other types of nanocrystals besides quantum dots are also possible in other embodiments. In some cases, the nanocrystal is a quantum dot containing one or more metals. In some embodiments, the nanocrystal comprises a group III-V compound. In certain embodiments, the nanocrystal comprises a group II-VI compound. In some cases, the nanocrystal may comprise a group IV element. Examples of nanocrystals include Lead Sulfide (PbS), Lead Selenide (PbSe), Cadmium Sulfide (CdS), Cadmium Selenide (CdSe), Cadmium Telluride (CdTe), Cadmium Arsenide (CdAs), Indium Arsenide (InAs), Indium Phosphide (InP), Indium Antimonide (InSb), Zinc Sulfide (ZnS), Zinc Selenide (ZnSe), Zinc Telluride (ZnTe), Gallium Arsenide (GaAs), Gallium Phosphide (GaP), Gallium Antimonide (GaSb), Mercury Sulfide (HgS), Mercury Selenide (HgSe), Mercury Telluride (HgTe), Aluminum Arsenide (AlAs), Aluminum Phosphide (AlP), Aluminum Antimonide (AlSb). Many such nanocrystals are readily commercially available.

It should also be understood that other nanocrystals, or alloys or mixtures of nanocrystals, are also suitable for use in embodiments described herein. The specific composition of the nanocrystal is typically selected, in part, to provide the desired optical properties within the device. For example, the nanocrystal may be selected such that is capable of undergoing FRET with one or more components of the device, such as the organic material (e.g., a singlet fission material capable of generating singlet excitons from triplet-triplet annihilation events). In some embodiments, the nanocrystal includes a composition that is not PbS. It is also possible for composites of the invention to nanocrystals having different compositions.

In some embodiments, the nanocrystal is a colloidal nanocrystal. In some such embodiments, the nanocrystal may comprise a homogeneous core comprising a nanocrystal material as described above and an inorganic shell. In some embodiments, the inorganic shell comprises a nanocrystal material as described above (e.g., PbS, PbSe, CdS, CdSe, CdTe, CdAs, InAs, InP, InSb, ZnS, ZnSe, ZnTe, GaAs, GaP, GaSb, HgS, HgSe, HgTe, AlAs, AlP, AlSb, etc.). For example, in some embodiments, the inorganic shell comprises a group III-V compound (IUPAC Groups 13-15), a group II-VI compound (IUPAC Group 12-16), or a group IV element (IUPAC Group 14). In some embodiments, the inorganic shell material is different than the homogeneous core material.

The nanocrystals (e.g., quantum dots) generally have particle sizes of less than 1000 nanometers. For example, the average size of the nanocrystals may be less than about 1000 nm, less than about 800 nm, less than about 500 nm, less than about 300 nm, less than about 100 nm, less than about 80 nm, less than about 50 nm, less than about 30 nm, less than about 20 nm, less than about 10 nm, or less than about 5 nm. Thus, as examples, the average particle size of the nanocrystals may be less than 20 nanometers, or the average particle size is less than 5 nanometers (e.g., about 3.5 nanometers). In some embodiments, the average particle size of the nanocrystals is greater than about 0.5 nm or greater than about 1 nm. Combinations of any of these are also possible, e.g., the nanocrystals may have an average particle size of between about 1 nm and about 20 nm. Average particle size of a nanocrystal may be determined, for example, using profilometry or other established techniques.

Figure 2:
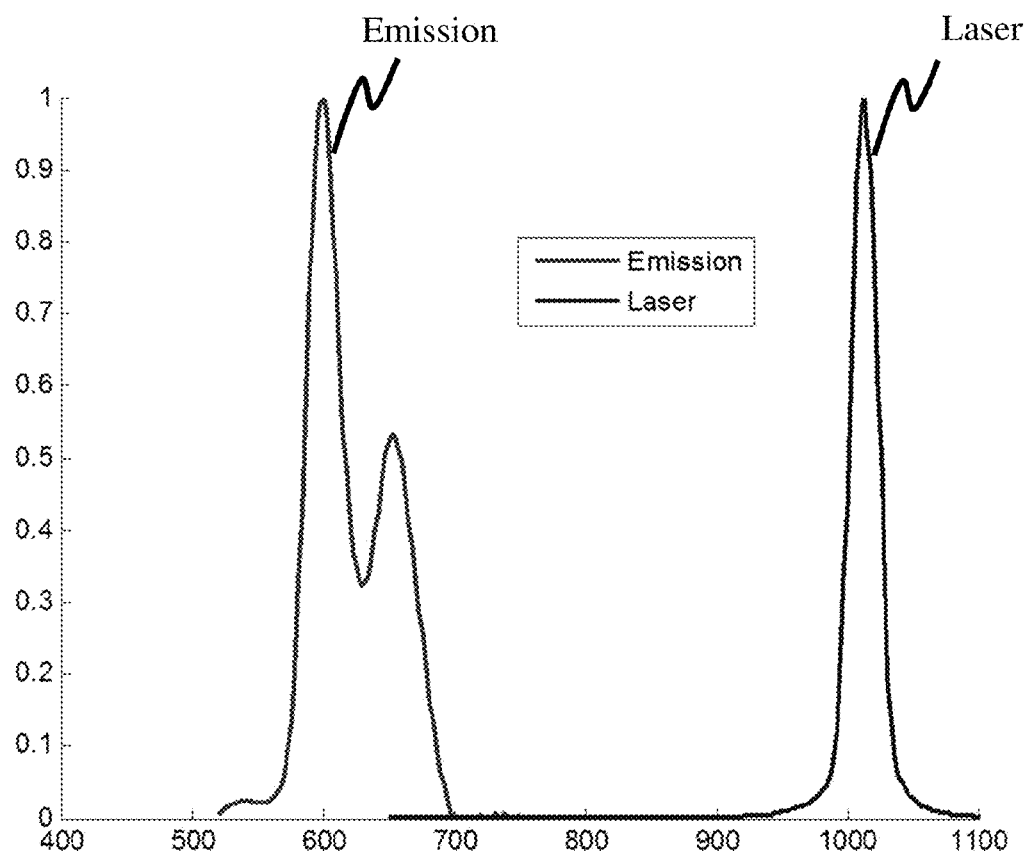
FIG. 2 is a plot of upconversion spectra of an article, according to one set of embodiments.

As discussed, the nanocrystal may be a quantum dot, or may be another suitable nanoparticle. In some embodiments, the nanocrystal has a particular band gap. The term "band gap" is known in the art and generally refers to the energy difference (e.g., in electron volts, eV) between the valence band and the conduction band of a material. In some cases, the band gap of the nanocrystal may range between about 0.5 eV and about 2.5 eV. In some embodiments, the band gap of the nanocrystal is greater than or equal to about 0.5 eV, greater than or equal to about 0.6 eV, greater than or equal to about 0.7 eV, greater than or equal to about 0.8 eV, greater than or equal to about 0.9 eV, greater than or equal to about 1.0 eV, greater than or equal to about 1.2 eV, greater than or equal to about 1.4 eV, greater than or equal to about 1.6 eV, greater than or equal to about 1.8 eV, greater than or equal to about 2.0 eV, greater than or equal to about 2.2 eV, or greater than or equal to about 2.4 eV. In certain embodiments, the band gap of the nanocrystal is less than about 2.5 eV, less than about 2.4 eV, less than about 2.2 eV, less than about 2.0 eV, less than about 1.8 eV, less than about 1.6 eV, less than about 1.4 eV, less than about 1.2 eV, less than about 1.0 eV, less than about 0.9 eV, less than about 0.8 eV, less than about 0.7 eV, or less than about 0.6 eV. Combinations of the above referenced ranges are also possible (e.g., between about 0.5 eV and about 2.5 eV). Other values are also possible. In an illustrative embodiment, the band gap of a PbS nanocrystal (PbS NC) is illustrated in FIG. 2B (e.g., the band gap of the PbS NC is about 1.0 eV, the different between the conductive band (e.g., 4.9 eV) and the valence band (e.g., 3.9 eV)).

The article may include additional components that may enhance device performance. For example, the device may include a component (e.g., a ligand) capable of facilitating energy transfer between the organic material and the nanocrystal. In some cases, the organic material, alone, may not produce an emission under the operating conditions of the device, but when arranged in combination with another component, the organic material may produce an emission. In some embodiments, the device comprises a ligand associated with a surface of the nanocrystal. In certain embodiments, the ligand may associate with the nanocrystal via formation of a bond, such as an ionic bond, a covalent bond, a hydrogen bond, a dative bond, Van der Waals interactions, and the like. The covalent bond may be, for example, carbon-carbon, carbon-oxygen, oxygen-silicon, sulfur-sulfur, phosphorus-nitrogen, carbon-nitrogen, metal-oxygen, or other covalent bonds. The hydrogen bond may be, for example, between hydroxyl, amine, carboxyl, thiol, and/or similar functional groups. The dative bond may be, for example, complexation or chelation between metal ions and monodentate or multidentate ligands. The ligand may be disposed, in some cases, between the nanocrystal and the organic material (e.g., on the surface of the nanocrystal and in direct contact with the organic material). In some embodiments, the ligand comprises an inorganic material. In certain embodiments, the ligand comprises an organic material.

Those skilled in the art will be able to select suitable ligands for use in the embodiments described herein, based upon the teachings of this specification. For example, in some embodiments, the ligand comprises a saturated or unsaturated, branched or unbranched polymer comprising a terminal carboxylic acid, amine, thiol, and/or pyridine. In certain embodiments, the ligand further comprises a halide, an oxide, or a hydroxide ion. Non-limiting examples of suitable ligands include oleic acid, capric acid, octanoic acid, or the like. For example, in some embodiments, the ligand comprises the structure $CH_3(CH_2)_nCOOH$ where n is 3-18 (e.g., n may be 3, 4, 5, 6, 7, 8, 9, 10, 11, 12, 13, 14, 15, 16, 17, and/or 18). In certain embodiments, the ligand comprises the structure $(CH_3)(CH_2)_pCH=CH(CH_2)_qCOOH$, wherein p and q are the same or different and each may independently be between 1-18 (e.g., 1, 2, 3, 4, 5, 6, 7, 8, 9, 10, 11, 12, 13, 14, 15, 16, 17, and/or 18). In some embodiments, the ligand comprises a thiol (e.g., benzenethiols such as 1,2-, 1,3-, and 1,4-benzenedithiol, 1,2-ethanedithiol (EDT), 3-mercaptopropionic acid (MPA)), a primary amine (e.g., 1,2-ethylenediamine (EDA)), ammonium thiocyanate (SCN), and/or a halide (e.g., tetrabutylammonium iodide (TBAI), tetrabutylammonium bromide (TBABr), tetrabutylammonium chloride (TBACl), tetrabutylammonium fluoride (TBAF).

In some embodiments, ligands, such as those described above (e.g., comprising the structure $CH_3(CH_2)_nCOOH$ or comprising the structure $(CH_3)(CH_2)_pCH=CH(CH_2)_qCOOH$), may be selected to have a particular length. For example, in some embodiments, the length of the ligand may be less than or equal to about 3 nm (e.g., less than or equal to about 2.5 nm, less than or equal to about 2 nm, less than or equal to about 1.5 nm, less than or equal to about 1.0 nm, or less than or equal to about 0.5 nm). In some embodiments, the ligand comprises an organic compound having a linear carbon chain length between 5 carbon atoms and 20 carbon atoms. For example, in some embodiments, the ligand may be at least 5 carbon atoms in length, at least 6 carbon atoms in length, at least 7 carbon atoms in length, at least 8 carbon atoms in length, at least 9 carbon atoms in length, at least 10 carbon atoms in length, at least 12 carbon atoms in length, at least 14 carbon atoms in length, at least 16 carbon atoms in length, or at least 18 carbon atoms in length. In certain embodiments, the ligand is less than 20 carbon atoms in length, less than 18 carbon atoms in length, less than 16 carbon atoms in length, less than 14 carbon atoms in length, less than 12 carbon atoms in length, less than 10 carbon atoms in length, less than 9 carbon atoms in length, less than 8 carbon atoms in length, less than 7 carbon atoms in length, or less than 6 carbon atoms in length. Combinations of the above-referenced ranges are also possible (e.g., between 5 carbon atoms and 20 carbon atoms in length, between 7 carbon atoms and 16 carbon atoms in length).

In some embodiments, as described above, the transfer of triplet excitons from the nanocrystal to the organic material may occur at a high efficiency. For example, in some embodiments, the energy transfer efficiency may be greater than or equal to about 20%, greater than or equal to about 40%, greater than or equal to about 50%, greater than or equal to about 75%, or greater than or equal to about 90%. In certain embodiments, the presence of an additional component (e.g., a ligand) may increase the efficiency of triplet exciton transfer from the organic material to the nanocrystal, as compared to articles that do not include an additional component (e.g., the ligand). Methods for determining transfer efficiency are known in the art and may include, for example, transient photoluminescence spectroscopy.

The components of the article may arranged in various configurations. In some cases, the organic material, the nanocrystals, and, optionally, a ligand, may be formed as layers or films. In some embodiments, the nanocrystal and/or the ligand may be dispersed in clusters throughout the organic material. In some embodiments, the organic material and/or the ligand may be dispersed in clusters throughout the nanocrystals (e.g., a nanocrystal layer). In some cases, the components may be randomly dispersed with respect to one another, thereby forming a heterogeneous material. In some cases, an array of different articles with different compositions and different morphologies or different layouts can be used.

For example, in some embodiments, components of articles described herein may be provided in the form of films or layers, such as a thin film. For example, one or more of the organic material, nanocrystal, optional ligands, or other components, may be provided in the form of thin films or layers such that a multilayer stack is formed. In some cases, the thickness of the film may be between about 1 nm and about 1 micrometer, or between about 1 nm and about 500 nm, or between about 1 nm and about 500 nm, or between about 1 nm and about 250 nm, or between about 1 nm and about 100 nm. In some cases, the film may have an average thickness of less than about 1000 nm, less than about 750 nm, less than about 500 nm, less than about 250 nm, less than about 100 nm, and/or the film may have an average thickness of at least about 1 nm, at least about 10 nm, at least about 100 nm, at least about 250 nm, at least about 500 nm, at least about 750 nm, etc., and/or combinations thereof (e.g., the film may be between about 1 nm and about 1,000 nm). If more than one film is present (e.g., a film of organic material, a film of nanocrystals, a film of ligand, etc.), the films may each independently be the same or different sizes.

Film thicknesses may be measured using profilometry. In some embodiments, it may be desirable to provide the organic material as a relatively thin film. In some cases, the thickness of the organic material may be from about 1 nm to about 250 nm, from about 1 nm to about 50 nm, or from about 1 nm to about 25 nm (e.g., 15 nm). It should be understood that in some embodiments, a relatively greater thickness may be desired (e.g., greater than 100 nm).

Those of ordinary skill in the art will be aware of methods for forming films or layers of various components, including solution coating, ink jet printing, spin coating, dip coating, spray coating, evaporation techniques such as chemical vapor deposition and the like. In some embodiments, a solution may be provided comprising the organic material, the nanocrystal, and/or an optional ligand in a solvent (e.g., tetrahydrofuran, toluene, benzene, diethyl ether, hexanes, dimethylsulfoxide, etc.). One or more, or all of the components to be incorporated in the film may be soluble or substantially soluble in the solvent. The solution may be placed on, or in contact with, a substrate or other component of the device, and the solvent may be evaporated, thereby forming a film. In some cases, a mixture of the organic material, the nanocrystal, and/or an optional ligand may be directly evaporated onto a surface (e.g., in the absence of a solvent).

In other cases, one material may be dispersed within another material in the form of clusters, e.g., as is shown in FIG. 1B. For instance, nanocrystals may be evenly dispersed in a layer or film of organic material, or vice versa. The nanocrystals may be homogenously dispersed, or dispersed in clusters, e.g., having an average diameter of less than about 1000 nm, less than about 750 nm, less than about 500 nm, less than about 250 nm, less than about 100 nm, or the like.

Articles described herein (e.g., comprising an organic material, a nanocrystal, and, optionally, a ligand) may be exposed to electromagnetic radiation using methods known to those of ordinary skill in the art. In some embodiments, electromagnetic radiation is applied to the article to decrease the wavelength and/or the intensity of the electromagnetic radiation. That is to say, in some embodiments, the articles described herein absorb (e.g., the organic material absorbs) electromagnetic radiation (e.g., light) at a first wavelength and emits (e.g., emitted by the nanocrystal) electromagnetic radiation at a second wavelength less than the first wavelength (i.e. upconversion of the electromagnetic radiation).

The wavelength emitted refers to the wavelength at which the peak maximum of the emission occurs in an emission spectrum. The emission may be a particular peak having the largest intensity in an emission spectrum (e.g. a fluorescence spectrum), or, alternatively, the emission may be a peak in an emission spectrum that has at least a defined maximum, but has a smaller intensity relative to other peaks in the emission spectrum. Methods for determining wavelength emission are known in the art and may include, for example, photoluminescence excitation spectroscopy.

In some embodiments, a change in luminescence intensity may occur for an emission with substantially no shift in the wavelength of the luminescence (e.g., emission), wherein the intensity of the emission changes but the wavelength remains essentially unchanged. In other embodiments, the change in luminescence intensity may occur for an emission in combination with a shift in the wavelength of the luminescence (e.g., emission). For example, an emission may simultaneously undergo a shift in wavelength in addition to an increase or decrease in luminescence intensity.

In some embodiments, the average wavelength of light absorbed by the composition is between about 400 nm and about 1600 nm. For example, in some embodiments, the average wavelength of light absorbed by the composition may be greater than or equal to about 400 nm, greater than or equal to about 500 nm, greater than or equal to about 600 nm, greater than or equal to about 700 nm, greater than or equal to about 800 nm, greater than or equal to about 900 nm, greater than or equal to about 1000 nm, greater than or equal to about 1100 nm, greater than or equal to about 1200 nm, greater than or equal to about 1300 nm, greater than or equal to about 1400 nm, or greater than or equal to about 1500 nm. In certain embodiments, the average wavelength of light absorbed by the composition may be less than about 1600 nm, less than about 1500 nm, less than about 1400 nm, less than about 1300 nm, less than about 1200 nm, less than about 1100 nm, less than about 1000 nm, less than about 900 nm, less than about 800 nm, less than about 700 nm, less than about 600 nm, or less than about 500 nm. Combinations of the above-referenced ranges are also possible (e.g., an average wavelength between about 400 nm and about 1600 nm)

In certain embodiments, the percent difference between the average wavelength absorbed by the composition and the average wavelength emitted by the composition is at least about 10%. For example, in some embodiments, the percent difference between the average wavelength absorbed by the composition and the average wavelength emitted by the composition is at least about 10%, at least about 20%, at least about 50%, at least about 70%, or at least about 90% relative to average wavelength emitted.

As used herein, the term "substituted" is contemplated to include all permissible substituents of organic compounds, "permissible" being in the context of the chemical rules of valence known to those of ordinary skill in the art. It will be understood that "substituted" also includes that the substitution results in a stable compound, e.g., which does not spontaneously undergo transformation such as by rearrangement, cyclization, elimination, etc. In some cases, "substituted" may generally refer to replacement of a hydrogen with a substituent as described herein. However, "substituted," as used herein, does not encompass replacement and/or alteration of a key functional group by which a molecule is identified, e.g., such that the "substituted" functional group becomes, through substitution, a different functional group. For example, a "substituted phenyl group" must still comprise the phenyl moiety and cannot be modified by substitution, in this definition, to become, e.g., a pyridine ring. In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. For purposes of this invention, the heteroatoms such as nitrogen may have hydrogen substituents and/or any permissible substituents of organic compounds described herein which satisfy the valencies of the heteroatoms.

Examples of substituents include, but are not limited to, aliphatic, alicyclic, heteroaliphatic, heteroalicyclic, halogen, azide, alkyl, aralkyl, alkenyl, alkynyl, cycloalkyl, hydroxyl, alkoxyl, amino, amino, nitro, sulfhydryl, imino, amido, phosphonate, phosphinate, carbonyl, carboxyl, carboxyl, silyl, ether, alkylthio, heteroalkylthio, heteroarylthio, sulfonyl, sulfonamido, ketone, aldehyde, ester, heterocyclyl, aromatic or heteroaromatic moieties, —$CF_3$, —CN, aryl, aryloxy, perhaloalkoxy, aralkoxy, heteroaryl, heteroaryloxy, heteroarylalkyl, heteroaralkoxy, azido, amino, halide, alkylthio, oxo, acylalkyl, carboxy esters, -carboxamido, acyloxy, aminoalkyl, alkylaminoaryl, alkylaryl, alkylaminoalkyl, alkoxyaryl, arylamino, aralkylamino, alkylsulfonyl, -carboxamidoalkylaryl, -carboxamidoaryl, hydroxyalkyl, haloalkyl, alkylaminoalkylcarboxy-, aminocarboxamidoalkyl-, cyano, alkoxyalkyl, perhaloalkyl, arylalkyloxyalkyl, (e.g., $SO_4(R')_2$), a phosphate (e.g., $PO_4(R')_3$), a silane (e.g., $Si(R')_4$), a urethane (e.g., R'O(CO)NHR'), and the like. Additionally, the substituents may be selected from F, Cl, Br, I, —OH, —$NO_2$, —CN, —NCO, —$CF_3$, —$CH_2CF_3$, —$CHCl_2$, —$CH_2OR_x$, —$CH_2CH_2OR_x$, —$CH_2N(R_x)_2$, —$CH_2SO_2CH_3$, —$C(O)R_x$, —$CO_2(R_x)$, —$CON(R_x)_2$, —$OC(O)R_x$, —$C(O)OC(O)R_x$, —$OCO_2R_x$, —$OCON(R_x)_2$, —$N(R_x)_2$, —$S(O)_2R_x$, —$OCO_2R_x$, —$NR_x(CO)R_x$, —$NR_x(CO)N(R_x)_2$, wherein each occurrence of $R_x$ independently includes, but is not limited to, H, aliphatic, alicyclic, heteroaliphatic, heteroalicyclic, aryl, heteroaryl, alkylaryl, or alkylheteroaryl, wherein any of the aliphatic, alicyclic, heteroaliphatic, heteroalicyclic, alkylaryl, or alkylheteroaryl substituents described above and herein may be substituted or unsubstituted, branched or unbranched, cyclic or acyclic, and wherein any of the aryl or heteroaryl substituents described above and herein may be substituted or unsubstituted.

In general, the term "aliphatic," as used herein, includes both saturated and unsaturated, straight chain (i.e., unbranched) or branched aliphatic hydrocarbons, which are optionally substituted with one or more functional groups, as defined below. As will be appreciated by one of ordinary skill in the art, "aliphatic" is intended herein to include, but is not limited to, alkyl, alkenyl, alkynyl moieties. Illustrative aliphatic groups thus include, but are not limited to, for example, methyl, ethyl, n-propyl, isopropyl, allyl, n-butyl, sec-butyl, isobutyl, tert-butyl, n-pentyl, sec-pentyl, isopentyl, tert-pentyl, n-hexyl, sec-hexyl, moieties and the like, which again, may bear one or more substituents, as previously defined.

As used herein, the term "alkyl" is given its ordinary meaning in the art and may include saturated aliphatic groups, including straight-chain alkyl groups, branched-chain alkyl groups, cycloalkyl (alicyclic) groups, alkyl substituted cycloalkyl groups, and cycloalkyl substituted alkyl groups. An analogous convention applies to other generic terms such as "alkenyl," "alkynyl," and the like. Furthermore, as used herein, the terms "alkyl," "alkenyl," "alkynyl," and the like encompass both substituted and unsubstituted groups.

In some embodiments, a straight chain or branched chain alkyl may have 30 or fewer carbon atoms in its backbone, and, in some cases, 20 or fewer. In some embodiments, a straight chain or branched chain alkyl has 12 or fewer carbon atoms in its backbone (e.g., $C_1$-$C_{12}$ for straight chain, $C_3$-$C_{12}$ for branched chain), has 6 or fewer, or has 4 or fewer. Likewise, cycloalkyls have from 3-10 carbon atoms in their ring structure or from 5, 6 or 7 carbons in the ring structure. Examples of alkyl groups include, but are not limited to, methyl, ethyl, propyl, isopropyl, cyclopropyl, butyl, isobutyl, tert-butyl, cyclobutyl, hexyl, cyclohexyl, and the like. In some cases, the alkyl group might not be cyclic. Examples of non-cyclic alkyl include, but are not limited to, methyl, ethyl, propyl, isopropyl, n-butyl, tert-butyl, n-pentyl, neopentyl, n-hexyl, n-heptyl, n-octyl, n-decyl, n-undecyl, and dodecyl.

The terms "alkenyl" and "alkynyl" refer to unsaturated aliphatic groups analogous in length and possible substitution to the alkyls described above, but that contain at least one double or triple bond respectively. Alkenyl groups include, but are not limited to, for example, ethenyl, propenyl, butenyl, 1-methyl-2-buten-1-yl, and the like. Non-limiting examples of alkynyl groups include ethynyl, 2-propynyl (propargyl), 1-propynyl, and the like.

The terms "heteroalkenyl" and "heteroalkynyl" refer to unsaturated aliphatic groups analogous in length and possible substitution to the heteroalkyls described above, but that contain at least one double or triple bond respectively.

As used herein, the term "halogen" or "halide" designates —F, —Cl, —Br, or —I.

The term "aryl" refers to aromatic carbocyclic groups, optionally substituted, having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl). That is, at least one ring may have a conjugated Pi electron system, while other, adjoining rings can be cycloalkyls, cycloalkenyls, cycloalkynyls, aryls, and/or heterocycyls. The aryl group may be optionally substituted, as described herein. "Carbocyclic aryl groups" refer to aryl groups wherein the ring atoms on the aromatic ring are carbon atoms. Carbocyclic aryl groups include monocyclic carbocyclic aryl groups and polycyclic or fused compounds (e.g., two or more adjacent ring atoms are common to two adjoining rings) such as naphthyl group. Non-limiting examples of aryl groups include phenyl, naphthyl, tetrahydronaphthyl, indanyl, indenyl and the like.

The terms "heteroaryl" refers to aryl groups comprising at least one heteroatom as a ring atom, such as a heterocycle. Non-limiting examples of heteroaryl groups include pyridyl, pyrazinyl, pyrimidinyl, pyrrolyl, pyrazolyl, imidazolyl, thiazolyl, oxazolyl, isooxazolyl, thiadiazolyl, oxadiazolyl, thiophenyl, furanyl, quinolinyl, isoquinolinyl, and the like.

It will also be appreciated that aryl and heteroaryl moieties, as defined herein, may be attached via an aliphatic, alicyclic, heteroaliphatic, heteroalicyclic, alkyl or heteroalkyl moiety and thus also include -(aliphatic)aryl, -(heteroaliphatic)aryl, -(aliphatic)heteroaryl, -(heteroaliphatic)heteroaryl, -(alkyl)aryl, -(heteroalkyl)aryl, -(heteroalkyl)aryl, and -(heteroalkyl)-heteroaryl moieties. Thus, as used herein, the phrases "aryl or heteroaryl" and "aryl, heteroaryl, (aliphatic)aryl, -(heteroaliphatic)aryl, -(aliphatic)heteroaryl, -(heteroaliphatic)heteroaryl, -(alkyl)aryl, -(heteroalkyl)aryl, -(heteroalkyl)aryl, and -(heteroalkyl)heteroaryl" are interchangeable.

The term "arylalkyl," as used herein, refers to a group comprising an aryl group attached to the parent molecular moiety through an alkyl group.

The term "arylheteroalkyl," as used herein, refers to a group comprising an aryl group attached to the parent molecular moiety through a heteroalkyl group.

The term "heteroarylalkyl," as used herein, refers to a group comprising a heteroaryl group attached to the parent molecular moiety through an alkyl group.

Int. Pat. Apl. Pub. No. WO 2014/089179, published Jun. 12, 2014, entitled "Devices Including Organic Materials Such as Singlet Fission Materials," is incorporated herein by reference in its entirely. In addition, U.S. Pat. Apl. No. 62/117,012, filed on Feb. 17, 2015, entitled "Compositions and Methods for the Downconversion of Light," is also incorporated herein by reference in its entirely. Also incorporated herein by reference is U.S. Provisional Application Ser. No. 62/117,000, filed Feb. 17, 2015.

Having thus described several aspects of some embodiments of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

EXAMPLES

The following examples are intended to illustrate certain embodiments of the present invention, but do not exemplify the full scope of the invention.

Example 1

The following example describes the synthesis of nanocrystals, according to some embodiments.

Lead sulfide nanocrystals (NC) were synthesized as described below. Specifically, lead(II) acetate trihydrate (11.38 g, 30 mmol), 1-octadecene and oleic acid (varied quantities as designated by Table 1) were degassed in a 1000 ml three-neck round-bottom flask at 100° C. until the solution turned clear. The solution was cannula transferred to a nitrogen-flushed 1000 mL four-neck round-bottom flask equipped with a mechanical stirrer. Under nitrogen flow, the solution was heated to the injection temperature (see below), at which point a mixture of bis(trimethylsilyl)sulfide (3.15 ml, 15 mmol) in 1-octadecene (150 ml) was rapidly injected. The resulting nanocrystals were transferred to a nitrogen glovebox where flocculation was performed three times with anhydrous butanol, methanol, and/or acetone. The nanocrystals were redispersed in hexanes or octane.

TABLE 1

| First absorption feature (nm) | Quantity in reaction pot (ml) | | Injection temp (° C.) | Growth time (s) | Flocculation solvent |
|---|---|---|---|---|---|
| | 1-octadecene | oleic acid | | | |
| 931 | 300 | 21 | 120 | 0 | acetone |
| 1010 | 263 | 37 | 150 | 30 | butanol and methanol |
| 1135 | 225 | 75 | 150 | 60 | butanol and methanol |
| 1308 | 150 | 150 | 150 | 30 | butanol |

Example 2

In the following example, a device containing an article as described herein is investigated.

A device was fabricated with 1010 nm absorption peak PbS nanocrystals with oleic acid ligands in a bilayer with 80 nm of rubrene with tetraphenyldibenzoperiflanthene doped in at 0.5 wt %. The excitation light was generated from a SuperK Supercontinuum device and fed into a monochromator. The emission was captured by a SP300i spectrometer after the light was passed through a 700 nm short pass filter, as is plotted in FIG. 2. The data demonstrates upconversion from 1000 nm to <600 nm, a relatively large wavelength change for triplet-triplet annihilation based upconversion.

Figure 3:
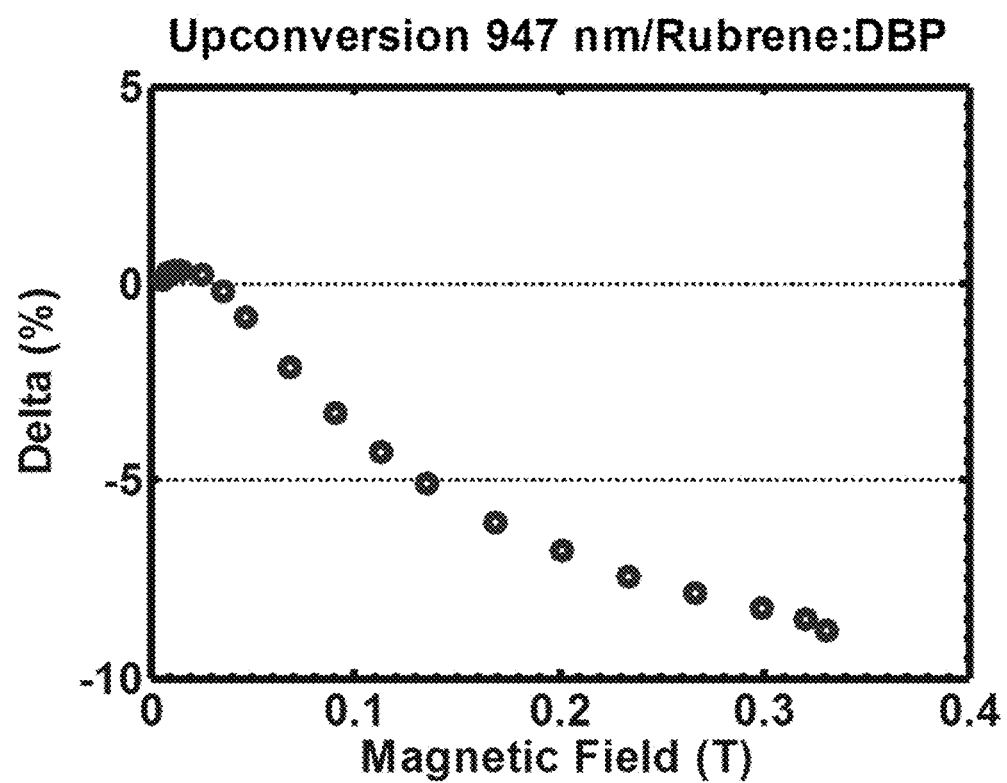
FIG. 3 is a plot of the magnetic field effect on fluorescence of an article, according to one set of embodiments.

The magnetic field effect of the device is plotted in FIG. 3. The magnetic field effect on fluorescence was measured and the light was filtered such that only tetraphenyldibenzoperiflanthene emission was measured. The sample was excited by an 808 nm laser. The magnetic field effect was consistent with triplet-triplet annihilation.

Example 3

In the following example, articles as described herein are investigated.

Figure 4:
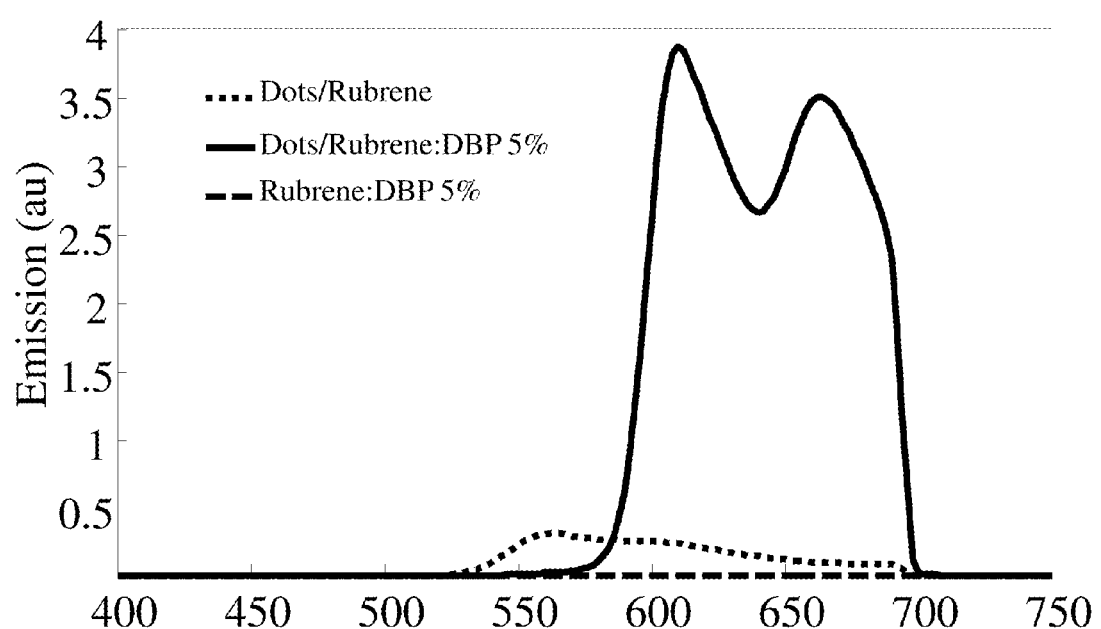
FIG. 4 is a plot of emission spectra for nanocrystal and organic material films, according to one set of embodiments.

The emission spectra from two samples are shown in FIG. 4, demonstrating the efficiency enhancement of rubrene doped with tetraphenyldibenzoperiflanthene in a film (dots/rubrene:DBP 5%). The dashed curve (dots/rubrene) is an upconversion device with PbS nanocrystals (dots) and rubrene only as the emitter. The solid curve (dots/rubrene: DBP 5%) is for a device mixing in tetraphenyldibenzoperiflanthene in the rubrene at 5 wt %, showing a 9.5× increase in emission as compared to rubene alone. The red curve contains no nanocrystals and showed no upconversion (as a control).

Example 4

In the following example, a device containing an article as described herein is investigated.

Figure 5A:
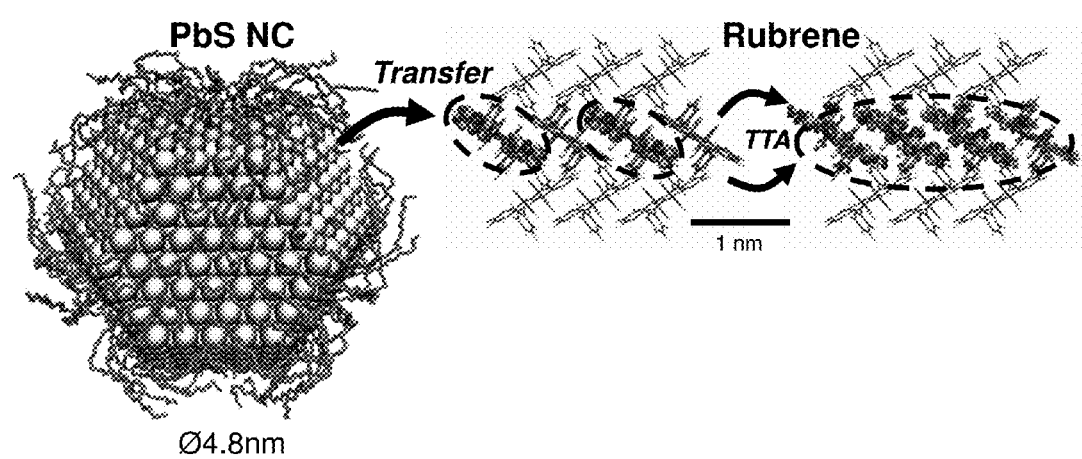
FIG. 5A is a schematic of a nanocrystal and an organic material, according to one set of embodiments.
Figure 5B:
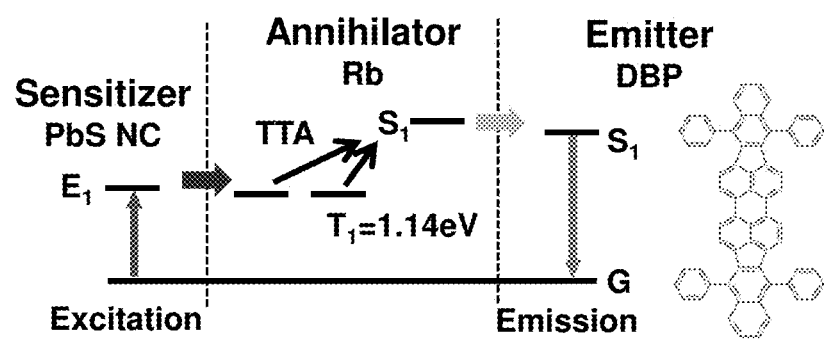
FIG. 5B is a schematic energy diagram showing the processes of triplet sensitization by the nanocrystals, triplet-triplet annihilation in an organic material and emission, according to one set of embodiments.
Figure 5C:
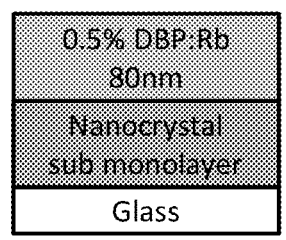
FIG. 5C is a schematic diagram of a device, according to one set of embodiments.

Devices with three sizes of lead sulphide (PbS) nanocrystals (NCs), as shown in FIG. 5A, were fabricated, all with native oleic acid ligands. The device had a structure as shown in FIG. 5C, in the form of a solid state thin film. When cast into thin films, the first excitonic absorption peaks were at $\lambda=850$, 960, and 1010 nm respectively. An 80-nm-thick film of rubrene doped with 0.5 vol % dibenzotetraphenylperiflanthene (DBP) was thermally evaporated to form a host-guest annihilator-emitter layer (e.g., which may be used in organic light-emitting diodes (OLEDs)) (FIGS. 5B-C). Rubrene was chosen as the annihilator as its first excited triplet state is at 1.14 eV, making it generally well-positioned for infrared sensitization. Calculations indicated that the triplet state in DBP lies ~0.2 eV higher than that of rubrene. Without wishing to be bound by theory, DBP may act as an acceptor for singlet excitons only.

Figure 6:
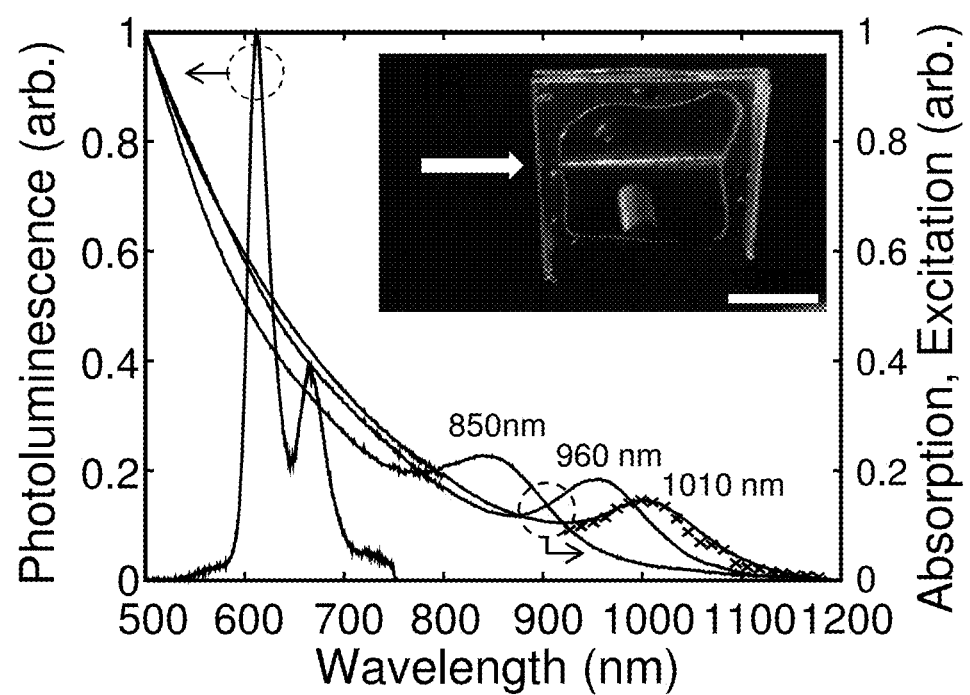
FIG. 6 is a plot of absorption, photoluminescence, and excitation spectra of an upconversion device, according to one set of embodiments.

To demonstrate energy transfer from the NCs to rubrene, the samples were excited with a $\lambda=808$ nm continuous-wave laser. Upconversion was apparent as emission from DBP was observed, with the bluest emission peak at $\lambda=612$ nm (FIG. 6). Control films consisting of only the organics or only the NCs exhibited substantially no visible emission under the same conditions. DBP doping also significantly improved device performance—the upconverted photoluminescence (PL) intensity of doped devices increased 19-fold compared to those with a neat rubrene layer.

To show that PbS NCs sensitize the TTA process over a broad wavelength range extending beyond $\lambda=1$ μm, the visible emission from an upconverter sensitized by $\lambda=1010$ nm NCs was monitored, while sweeping the excitation wavelength. The excitation spectrum in FIG. 6 (crosses) agrees well with the absorption spectrum of the NCs. The difference between the optical gap of these NCs and the triplet exciton energy in rubrene is less than 100 meV, demonstrating that sensitization can proceed with minimal exothermic drive.

The efficiency of the upconversion process was measured in an integrating sphere using a 91 mW pump laser at $\lambda=808$ nm, focused to a spot size of approximately $\varnothing=0.25$ mm and edge-coupled to the glass substrate waveguide, yielding an emissive stripe of dimensions $(0.35\pm0.10)\times 20$ mm² (FIG. 6, insert). The upconversion quantum efficiency, $\eta$, is defined by convention as the fraction of excited states in the sensitizer that are converted to a higher-energy emissive state in the annihilator. For the three sizes of PbS NCs, $\eta_{(850\ nm)}=(1.2\pm0.2)\%$, $\eta_{(960\ nm)}=(0.51\pm0.07)\%$, $\eta_{(1010\ nm)}=(0.21\pm0.03)\%$, at absorbed optical intensities of $(74\pm21)$, $(101\pm29)$, and $(143\pm41)$ mW cm⁻² respectively. The highest quantum efficiencies were attained when the NC layer was thin (~monolayer), likely due to a shorter diffusion path length to reach the bilayer interface as well as minimized re-absorption.

Figure 7:
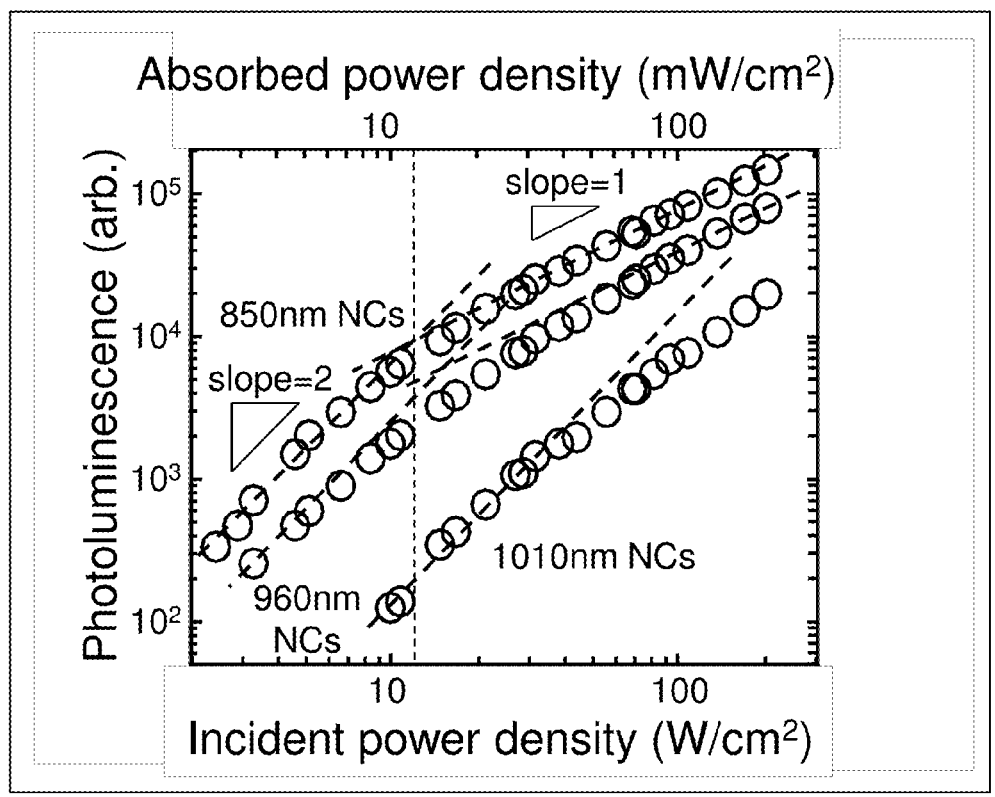
FIG. 7 is a plot of photoluminescence spectra of an article, according to one set of embodiments.

In TTA-based upconversion, the threshold excitation intensity at which the dependence of emission on incident light intensity transitions from quadratic to linear may be important. Without wishing to be bound by theory, below the threshold, the triplet population generally varies linearly with excitation power because triplet decay is generally dominated by first-order loss processes. The upconverted emission via bimolecular TTA is therefore generally quadratic with pump intensity. However, without wishing to be bound by theory, when the triplet density is sufficiently high, TTA becomes the dominant decay process, so the triplet density varies as the square root of the excitation flux. Thus, the intensity of upconverted emission generally becomes linear with pump power, and the efficiency saturates at its maximum value. FIG. 7 shows that for the NC-sensitized thin-film samples, the transition occurred at 12, 17, and 26 W cm⁻² for films with $\lambda=850$, 960, and 1010 nm NCs respectively. Maximum efficiencies were achieved at these incident light intensities even with the very low $(0.1\pm0.03)\%$ absorption of the sub-monolayer NC film. 12 mW cm⁻² of absorbed pump light at $\lambda=808$ nm generated $5\times10^{16}$ excitons cm⁻² s⁻¹, which was less than the available solar photon flux (A: 750-950 nm).

Figure 8A:
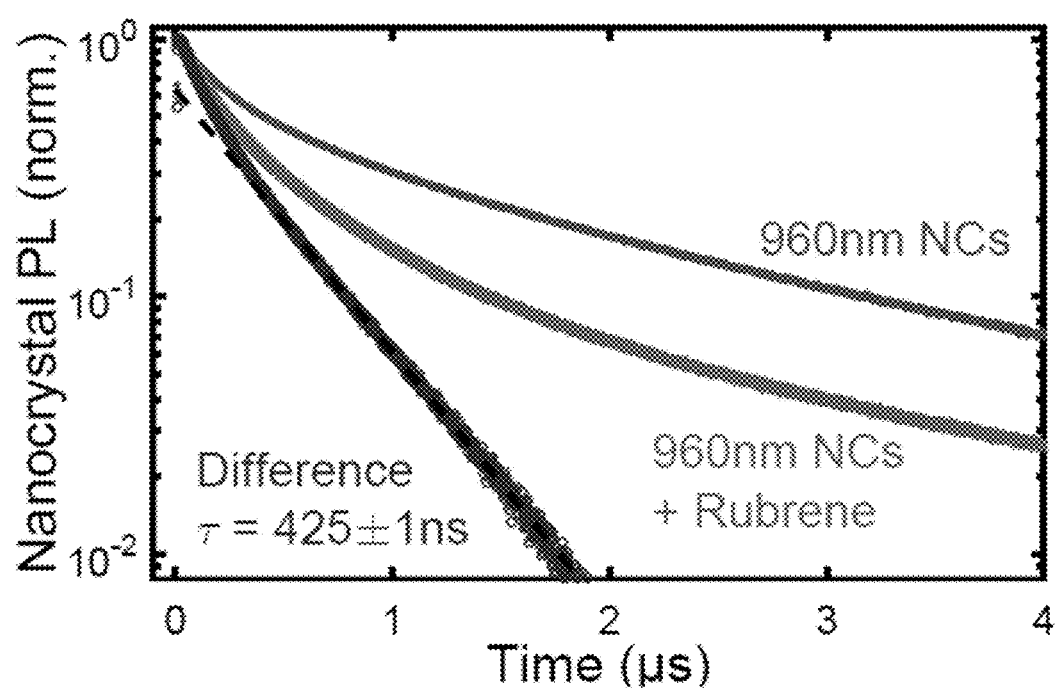
FIG. 8A is a plot of photoluminescence spectra of an upconversion article, according to one set of embodiments.

To elucidate the underlying physical processes and identify further device optimization pathways, the PL dynamics of the films were measured. The dynamics of the neat film of λ=960 nm NCs (FIG. 8A) were slow—multi-exponential at early times gave way to a mono-exponential decay with τ=2.4±0.1 μs.

By contrast, the addition of the organic layer added new decay pathways, accelerating the PL decay at early times (<2 μs). Subtraction of the emission from inactive NCs from the dynamics of the bilayer allowed for isolation of the dynamics of active NCs. The transfer dynamics observed were slow, with a dominant characteristic time of 520 ns. Given the microsecond-scale intrinsic decay dynamics of PbS NCs, even these transfer rates kinetically outcompete other processes so that transfer is reasonably efficient (>80%) from active NCs.

Figure 8B:
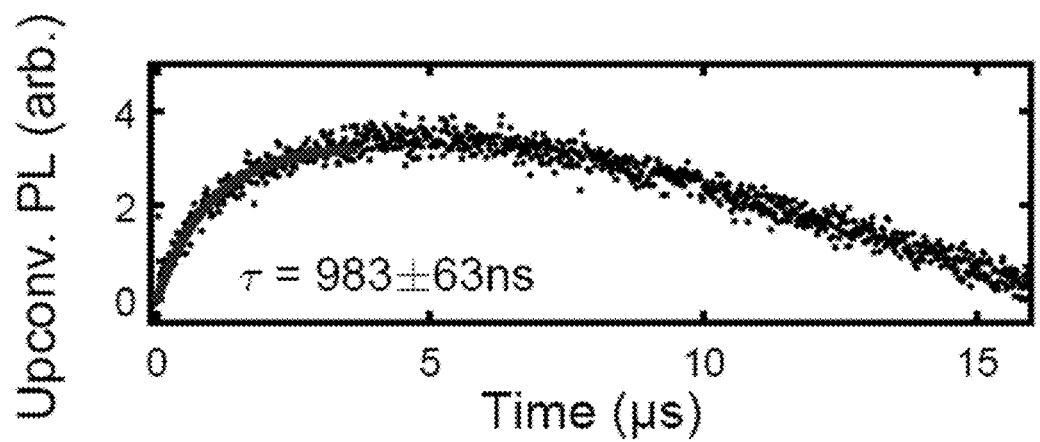
FIG. 8B is a plot of upconversion spectra of an article, according to one set of embodiments.

Lastly, to confirm that the quenching process was energy transfer resulting in visible emission, the rising dynamics of the PL from the DBP in the bilayer regions on the same film of λ=960 nm NCs was measured (FIG. 8B). Dynamics were observed to be slow, with the PL rising on a 980 ns timescale. This may reflect the additional time required for TTA to occur via diffusion. The emission then decayed much more slowly (>5 μs), reflecting very long lifetimes of isolated triplets in oligoacenes.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed:

1. A method of upconverting light, the method comprising:
    applying light having a first average wavelength to a nanocrystal associated with an organic material and a ligand, the organic material comprising an optionally substituted polyacene species or an optionally substituted polyene species, the nanocrystal comprising a group III-V compound, a group II-VI compound, or a group IV element; and
    determining light emitted from the organic material at a second average wavelength, wherein the second average wavelength is less than the first average wavelength.

2. The method as in claim 1, wherein the first average wavelength is between about 400 nm and about 1600 nm.

3. The method as in claim 1, wherein the organic material has a singlet energy of greater than about 2.2 eV and/or a triplet energy of greater than about 1.1 eV.

4. The method as in claim 1, wherein the organic material comprises an oligoacene, a heteroacene, a perylene, a phthalocyanine, an oligothiophene, a furane, an anthracene, a rubrene, a pentacene, or derivatives thereof.

5. The method as in claim 1, wherein the ligand comprises a saturated or unsaturated, banched or unbranched polymer comprising a terminal carboxylic acid, amine, thiol, and/or pyridine.

6. The method as in claim 1, wherein the ligand is has a linear carbon chain length between 7 carbon atoms and 16 carbon atoms.

7. The method as in claim 1, wherein the nanocrystal is selected from the group consisting of PbS, PbSe, CdS, CdSe, CdTe, CdAs, InAs, InP, and HgTe.

8. The method as in claim 1, wherein the nanocyrstal has a band gap of between about 0.5 eV and about 2.5 eV.

9. The method as in claim 1, wherein the nanocrystal has a first excited state energy greater than a triplet energy of the organic material.

10. The method as in claim 1, wherein the nanocrystal comprises an inorganic shell.

11. The method of claim 10, wherein the inorganic shell comprises a group III-V compound, a group II-VI compound, or a group IV element different than the nanocrystal.

12. The method as in claim 1, wherein the nanocrystal has a first excited energy state with an energy greater than a triplet energy of the organic material.

13. The method as in claim 1, wherein nanocrystal absorbs the light and transfers energy to the organic material.

14. The method as in claim 1, wherein triplet excitons are generated and undergo triplet-triplet annihilation in the organic material.

15. The method of claim 14, wherein the triplet-triplet annihilation creates a singlet state about twice the energy of the triplet exciton.

16. An article, comprising:
an organic material and a nanocrystal bound to a ligand, the organic material comprising a heteroacene, a perylene, a phthalocyanine, an oligothiophene, a furane, an anthracene, a rubrene, or a pentacene, the nanocrystal comprising a group III-V compound, a group II-VI compound, or a group IV element, the ligand being an organic compound having a linear carbon chain length of greater than or equal to 8 carbon atoms.

17. The article as in claim 16, wherein the organic material has a singlet energy of greater than about 2.2 eV and/or a triplet energy of greater than about 1.1 eV.

18. The article as in claim 16, wherein the nanocrystal has a first excited state energy greater than a triplet energy of the organic material.

19. The article as in claim 16, wherein the ligand comprises a saturated or unsaturated, banched or unbranched polymer comprising a terminal carboxylic acid, amine, thiol, and/or pyridine.

20. The article as in claim 16, wherein the ligand is has a linear carbon chain length between 7 carbon atoms and 16 carbon atoms.

21. The article as in claim 16, wherein the nanocrystal is selected from the group consisting of PbS, PbSe, CdS, CdSe, CdTe, CdAs, InAs, InP, and HgTe.

22. The article as in claim 16, wherein the nanocrystal has a band gap of between about 0.5 eV and about 2.5 eV.

23. The article as in claim 16, wherein the nanocrystal comprises an inorganic shell.

24. The article of claim 23, wherein the inorganic shell comprises a group III-V compound, a group II-VI compound, or a group IV element different than the nanocrystal.

25. An article, comprising:
an organic material and a nanocrystal bound to a ligand, the organic material comprising a heteroacene, a perylene, a phthalocyanine, an oligothiophene, a furane, an anthracene, a rubrene, or a pentacene, the nanocrystal having a first excited energy state with an energy greater than a triplet energy state of the organic material, the ligand having a length of no more than 3 nm.

* * * * *